United States Patent

Naldi

[11] Patent Number: 5,957,444
[45] Date of Patent: Sep. 28, 1999

[54] CLAMPING DEVICE FOR PANEL CUTTING MACHINES

[75] Inventor: Valter Naldi, Bologna, Italy

[73] Assignee: Selco Spa, Italy

[21] Appl. No.: 08/997,191

[22] Filed: Nov. 19, 1997

[30] Foreign Application Priority Data

Nov. 20, 1996 [IT] Italy .................................. BO96A1596

[51] Int. Cl.⁶ ....................................................... B25B 1/20
[52] U.S. Cl. ............................................. 269/43; 269/283
[58] Field of Search ............................. 269/43, 283, 284, 269/99, 287, 25

[56] References Cited

U.S. PATENT DOCUMENTS

| | | | |
|---|---|---|---|
| 2,567,586 | 9/1951 | Werder | 269/43 |
| 4,767,985 | 8/1988 | Shearer, Jr. et al. | |
| 5,148,605 | 9/1992 | Julia | 269/43 |
| 5,407,182 | 4/1995 | Hartley | 269/43 |
| 5,660,638 | 8/1997 | Amano et al. | 269/43 |

FOREIGN PATENT DOCUMENTS 9101640  5/1991  Germany.

*Primary Examiner*—Robert C. Watson
*Attorney, Agent, or Firm*—Webb Ziesenheim Logsdon Orkin & Hanson, P.C.

[57] ABSTRACT

A clamping device for a machine for cutting panels, and having a frame in turn having a tubular body; a gripper assembly for gripping the panels; and (for cutting multilayer panels) at least one substantially comb-shaped locating element against which the multilayer panels are positioned; the clamping device being characterized in that said substantially comb-shaped locating element releasably engages, by means of at least one appendix, at least a respective groove integral with the tubular body.

10 Claims, 4 Drawing Sheets

CLAMPING DEVICE FOR PANEL CUTTING MACHINES

BACKGROUND OF THE INVENTION

The present invention relates to a clamping device for panel cutting machines, in particular for cutting multilayer panels, and which may be used to advantage on horizontal cutting machines with an upper pressure clamping bar.

Clamping devices for panel cutting machines are known to comprise at least one gripper, which in turn normally comprises a substantially rectangular-section box frame, a gripper assembly for gripping the panels and which is fitted to and projects from one end of the box frame, and (for cutting multilayer panels) two comb-shaped locating elements screwed to said end of the box frame, on either side of the gripper assembly.

More specifically, said multilayer panels are each defined by a flat supporting body, normally of wood, and by two sheets of cover material glued to the top and bottom surfaces of the supporting body.

On clamping devices of the above type, the multilayer panels are stacked and positioned against the comb-shaped locating elements, so that the supporting body of each multilayer panel rests against a respective tooth, and the sheets of cover material project in relation to the respective supporting body and engage respective gaps between adjacent teeth.

Even during normal operation, the clamping device may be called upon to handle stacks of multilayer panels of different sizes, in particular different thicknesses, which means replacing the locating elements on the device with others designed to handle panels of a different size.

The main drawback of clamping devices of the above type lies in replacement of the locating elements, which is a fairly painstaking job involving considerable downtime and expense.

SUMMARY OF THE INVENTION

It is an object of the present invention to provide a clamping device designed to overcome the aforementioned drawbacks.

According to the present invention, there is provided a clamping device for a machine for cutting panels, in particular multilayer panels, and comprising a frame in turn having a tubular body; gripping means for gripping the panels; and at least one substantially comb-shaped locating element against which the multilayer panels are positioned; the clamping device being characterized in that said at least one substantially comb-shaped locating element releasably engages, by means of at least one appendix, at least a respective groove integral with the tubular body.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
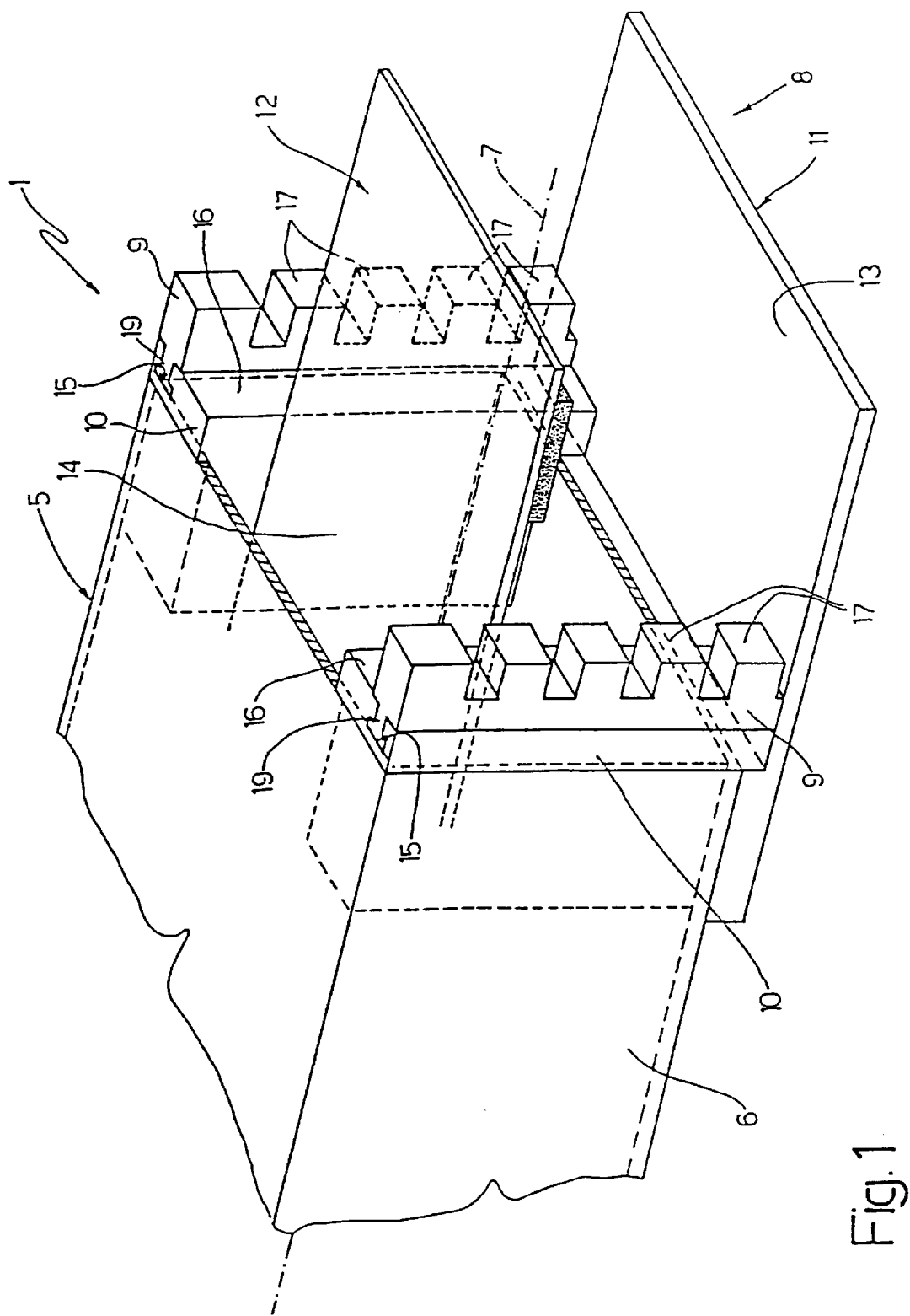
FIG. 1 shows a view in perspective of a clamping device in accordance with the teachings of the present invention.
Figure 2:
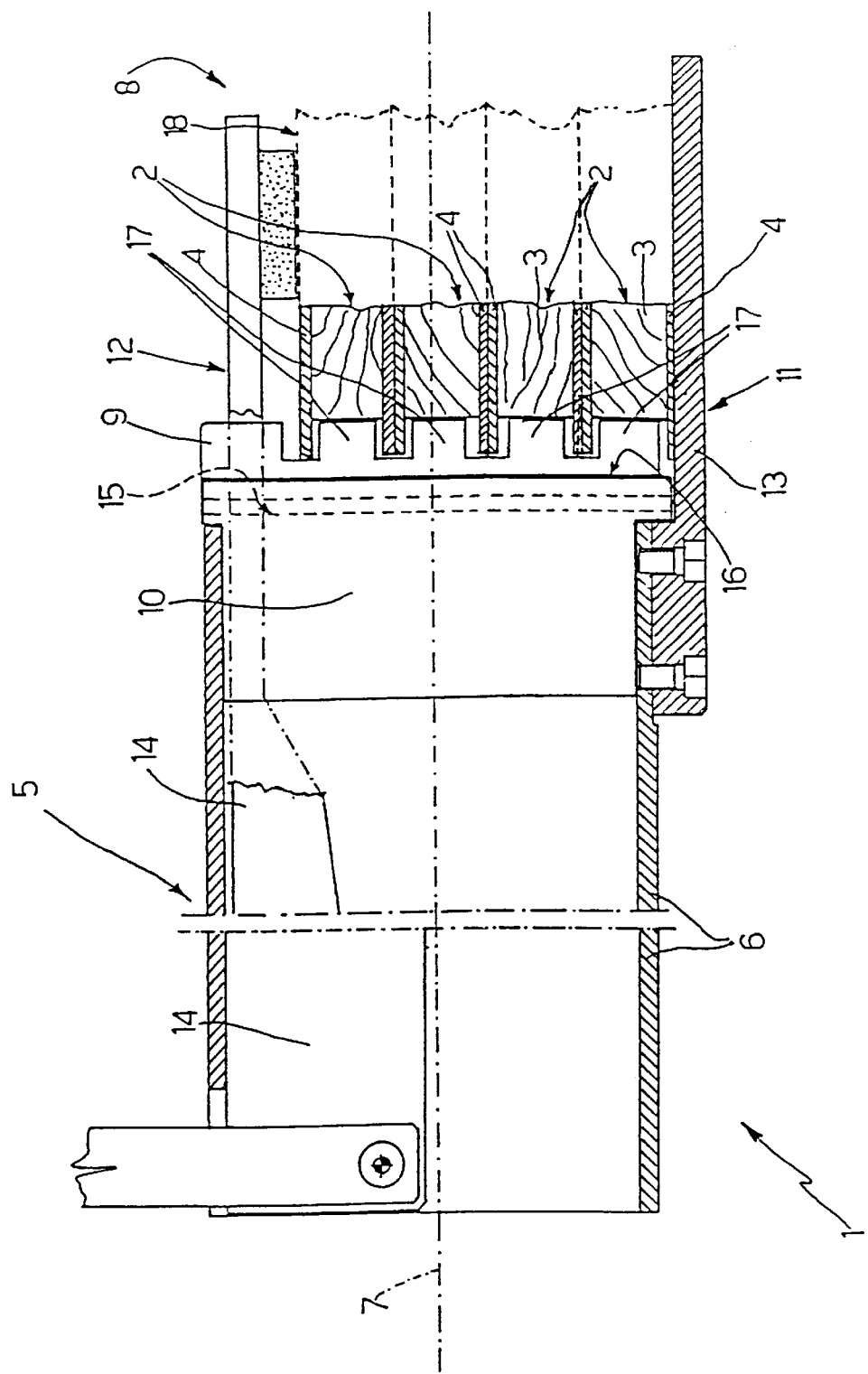
FIG. 2 shows a side view, with parts in section and parts removed for clarity, of the FIG. 1 clamping device.

Number 1 in FIGS. 1 and 2 indicates a clamping device fittable preferably, but not necessarily, to a cutting machine (in particular of the type featuring an upper pressure clamping bar) for cutting panels 2. In the case of multilayer panels, each panel comprises a flat supporting body 3 made preferably, but not necessarily, of wood; and two sheets 4 of cover material glued to the top and bottom surfaces of supporting body 3.

Device 1 comprises a frame 5 having, in the example shown, a substantially rectangular-section tubular body 6 extending coaxially with an axis 7; a known gripper assembly 8 fitted to frame 5 and for gripping multilayer panels 2; and two locating elements 9 against which multilayer panels 2 are positioned before being gripped by gripper assembly 8.

For each locating element 9, device 1 may also comprise a respective supporting element 10 integral with tubular body 6 and directly supporting locating element 9.

Supporting elements 10 are not essential for correct operation of the system, in that each locating element 9 may be fitted directly to tubular body 6.

More specifically, gripper assembly 8 comprises two jaws 11 and 12; jaw 11 is defined by a plate 13 parallel to axis 7, and which is fitted externally and in projecting manner to one end of tubular body 6; and jaw 12 is defined by an arm 14 housed inside tubular body 6 and having a first end portion hinged to and inside tubular body 6, and a second end portion opposite the first and facing plate 13 outside tubular body 6.

In the example shown, the second end portion of arm 14 is flat, is substantially parallel to plate 13, and is fitted underneath with a pad of plastic material for more effectively clamping multilayer panels 2.

Gripper assembly 8 also comprises a known hydraulic actuator (not shown) fitted to frame 5 and for so moving arm 14 as to move the second end portion of arm 14 towards or away from plate 13.

In the FIGS. 1 and 2 embodiment showing a number of multilayer panels 2, the two supporting elements 10 are fitted integrally to tubular body 6, directly on plate 13 and on either side of the second end portion of arm 14, and each comprise a respective preferably, but not necessarily, T-shaped groove 15 extending perpendicularly to plate 13 along a lateral surface 16 of supporting element 10. In the example shown, the lateral surfaces 16 of the two supporting elements 10 lie in the same plane, which is perpendicular to both axis 7 and plate 13.

Each locating element 9 is substantially comb-shaped, and comprises a number of aligned teeth 17 against which a stack 18 of multilayer panels 2 is positioned. More specifically, each panel 2 in stack 18 is so positioned that respective supporting body 3 rests against a respective tooth 17, and the two respective sheets 4 of cover material project with respect to supporting body 3 and engage respective gaps between the tooth 17 against which supporting body 3 rests and the two adjacent teeth 17.

Each locating element 9 also comprises, on the opposite side to teeth 17, an appendix 19 complementary in shape to groove 15, and extending perpendicularly to plate 13 along substantially the whole length of locating element 9.

Appendix 19 releasably engages respective groove 15 so that respective locating element 9, once fitted to respective supporting element 10, is substantially perpendicular to plate 13.

According to a first variation not shown, the two grooves 15 in respective surfaces 16 may extend parallel to plate 13, so that the two appendixes 19 of respective locating elements 9 also extend parallel to plate 13 to maintain locating elements 9 substantially perpendicular to plate 13.

According to a second variation not shown, grooves 15 are "dove-tailed."

According to a third variation not shown, supporting elements 10 are dispensed with altogether, and the two locating elements 9 are connected directly to tubular body 6 by providing tubular body 6 with grooves 15 mating with respective appendixes 19 on locating elements 9.

Figure 3:
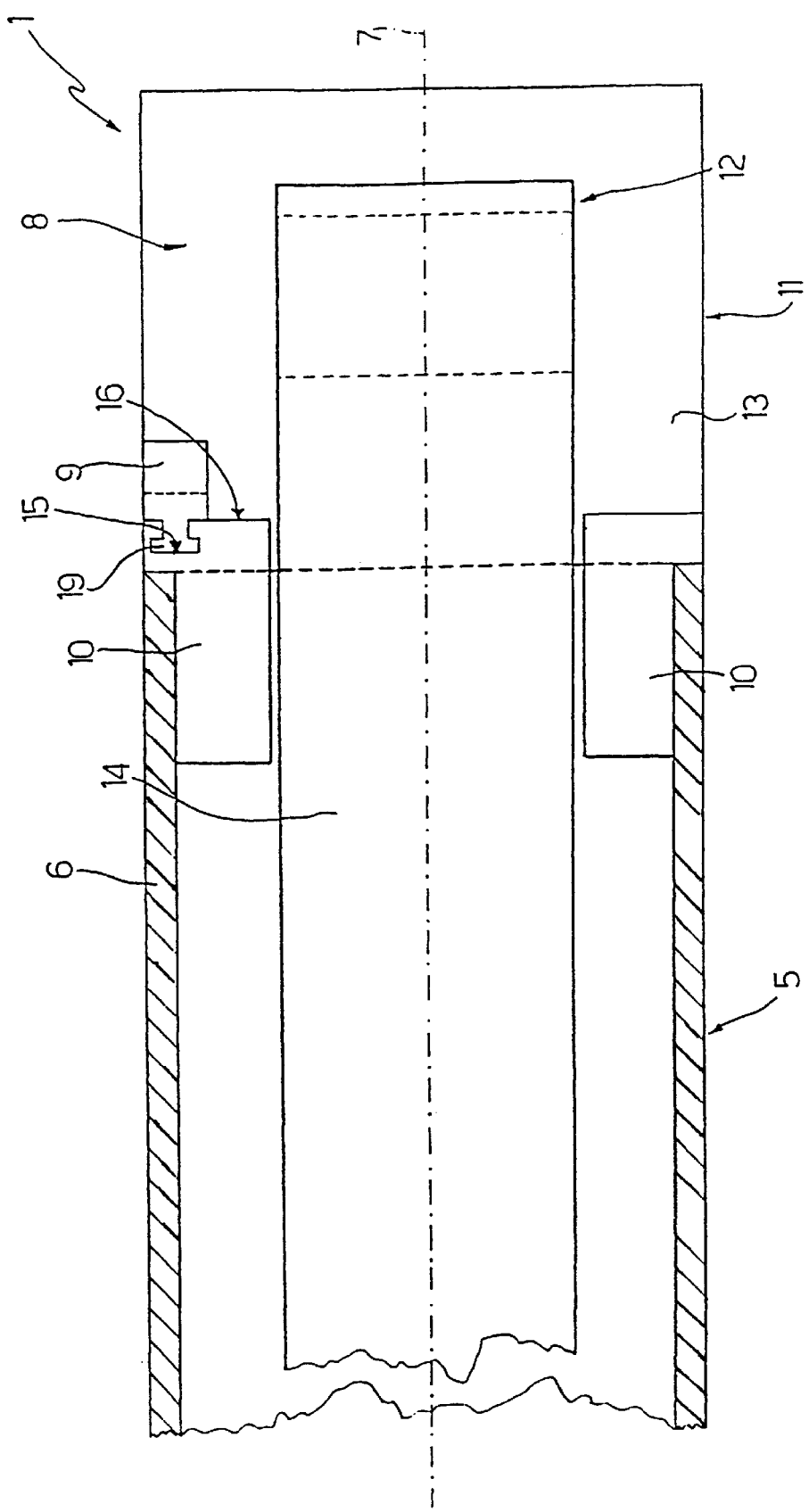
FIG. 3 shows a top plan view of the FIGS. 1 and 2 clamping device featuring one substantially comb-shaped locating element.

FIG. 3 shows a particular embodiment of the present invention wherein, as opposed to comprising a pair of substantially comb-shaped locating elements 9 as in the FIGS. 1 and 2 embodiment, clamping device 1 comprises only one locating element 9, and the second supporting element 10 has a completely smooth lateral surface 16, i.e. with no groove 15. In this case, the FIG. 4 apparatus 20 for handling a number of panels 2 comprises a pair of clamping devices 1, 1', the outermost portion of each of which comprises a substantially comb-shaped locating element 9.

Figure 4:
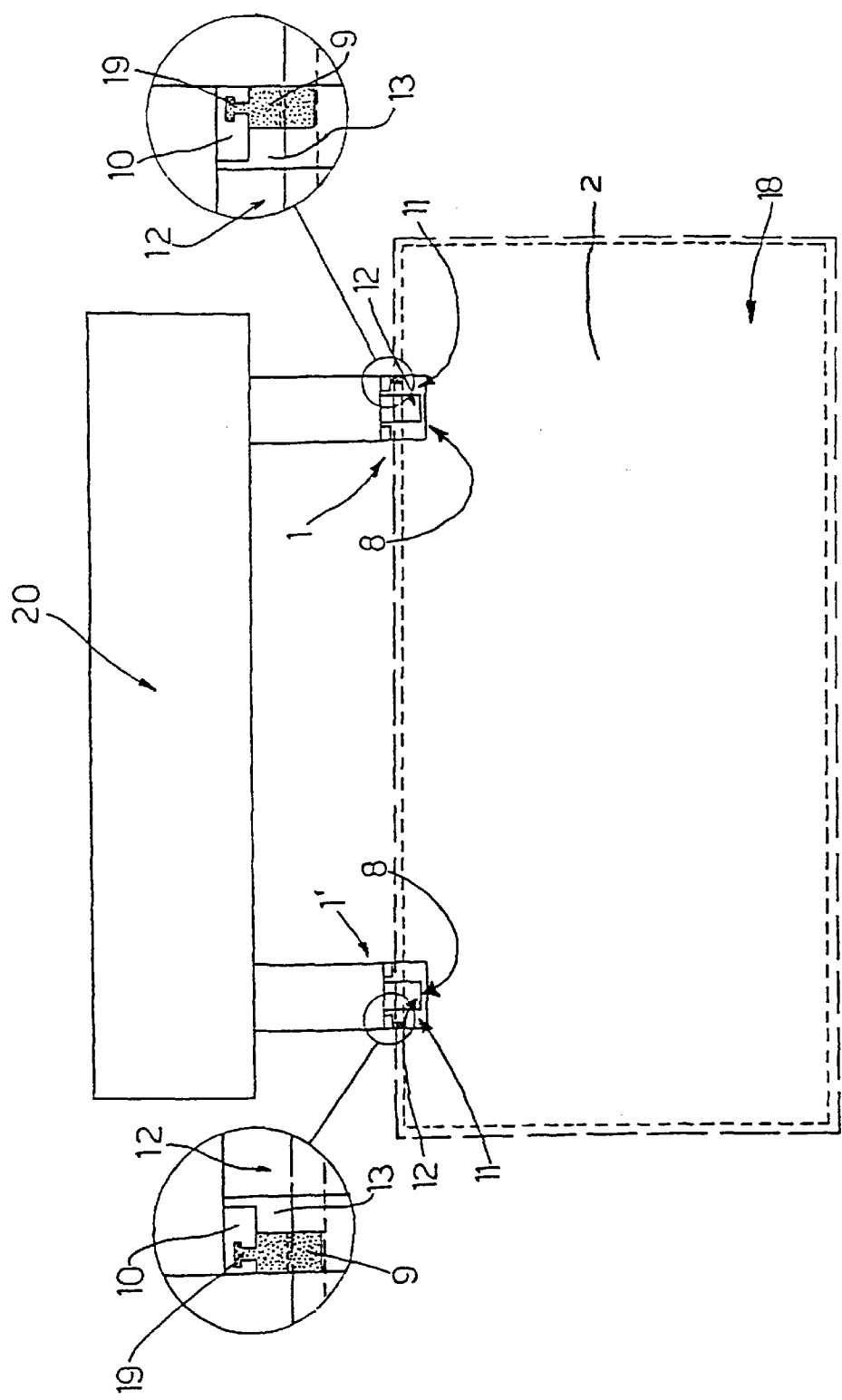
FIG. 4 shows a top plan view, with enlarged details for clarity, of an apparatus for handling multilayer panels and featuring two clamping devices, each having one substantially comb-shaped locating element.

As shown clearly in FIGS. 3 and 4, by removing locating elements 9 from respective grooves 15 formed in supporting elements 10, the lateral surfaces 16 of supporting elements 10 may be used for locating nonmultilayer panels 2. For supporting elements 10 to be used for locating both multilayer panels 2, when fitted with respective locating elements 9, and nonmultilayer panels 2 with no sheets of cover material glued to the top and bottom surfaces of the main central body, it is important that the lateral surfaces 16 of respective supporting elements 10 face jaws 11, 12 and in the opposite direction to the feed direction of panels 2 (multilayer or nonmultilayer). More specifically, supporting elements 10, and possibly also respective locating elements 9, may be confined within the overall dimensions of tubular body 6, as opposed to projecting laterally with respect to tubular body 6.

Operation of device 1 is clearly understandable from the foregoing description, and therefore requires no further explanation.

The main advantage of device 1 as described above is that of enabling fast, straightforward, low-cost replacement of locating elements 9 without excessively complicating the structure of device 1.

I claim:

1. A clamping device for a machine for cutting panels comprising a frame having a tubular body, at least one groove integral with said tubular body, at least one substantially comb-shaped locating element against which the panels are positioned for cutting, at least one appendix provided on said locating element and releasably engageable in said groove, and means for gripping the panels.

2. A device as claimed in claim 1, wherein said tubular body comprises at least one lateral surface configured to act as a locating surface for a number of panels.

3. A device as claimed in claim 2, wherein said at least one groove is located on said lateral surface.

4. A device as claimed in claim 3, including at least one supporting element integral with said tubular body, wherein said at least one lateral surface is located on said supporting element.

5. A device as claimed in claim 4, wherein said at least one groove is located on said lateral surface of said at least one supporting element integral with said tubular body.

6. A device as claimed in claim 2, wherein said tubular body has a central axis and the device includes at least two supporting elements, each supporting element having a lateral surface, with the lateral surfaces of said two supporting elements lying in the same plane which is perpendicular to the axis of the tubular body.

7. A device as claimed in claim 6, wherein said at least two supporting elements have respective locating elements and said locating elements are confined within the overall dimensions of said tubular body.

8. A device as claimed in claim 6, wherein said means for gripping the panels comprise a first jaw integral with said frame, a second jaw movable with respect to said frame and positioned opposite said first jaw between at least two substantially comb-shaped locating elements, and at least two supporting elements fitted to the frame, one on either side of said second jaw.

9. A device as claimed in claim 1, wherein said groove is substantially T-shaped.

10. A device as claimed in claim 1, wherein said groove is substantially dove-tailed.

* * * * *

UNITED STATES PATENT AND TRADEMARK OFFICE
CERTIFICATE OF CORRECTION

PATENT NO. : 5,957,444
DATED : September 28, 1999
INVENTOR(S) : Valter Naldi

It is certified that error appears in the above-identified patent and that said Letters Patent is hereby corrected as shown below:

Title Page, under [30] Foreign Application Priority Data,
"BO96A1596" should read --BO96A0596--.

Signed and Sealed this

Sixteenth Day of May, 2000

Attest:

Q. TODD DICKINSON

*Attesting Officer*    *Director of Patents and Trademarks*